(12) United States Patent
Migault et al.

(10) Patent No.: US 7,961,852 B2
(45) Date of Patent: Jun. 14, 2011

(54) METHOD AND DEVICE FOR TRANSMITTING REQUESTS FROM A REQUESTING MACHINE TO A DOMAIN NAME SERVER

(75) Inventors: Daniel Migault, Issy les Moulineaux (FR); Philippe Fouquart, Paris (FR)

(73) Assignee: France Telecom, Paris (FR)

( * ) Notice: Subject to any disclaimer, the term of this patent is extended or adjusted under 35 U.S.C. 154(b) by 480 days.

(21) Appl. No.: 10/583,589

(22) PCT Filed: Dec. 3, 2004

(86) PCT No.: PCT/FR2004/003123
§ 371 (c)(1),
(2), (4) Date: Jun. 19, 2006

(87) PCT Pub. No.: WO2005/069581
PCT Pub. Date: Jul. 28, 2005

(65) Prior Publication Data
US 2007/0121794 A1    May 31, 2007

(30) Foreign Application Priority Data
Dec. 19, 2003  (FR) ...................................... 03 15015

(51) Int. Cl.
*H04M 1/64* (2006.01)
(52) U.S. Cl. ............. 379/88.17; 379/88.19; 379/355.02; 379/355.03; 379/355.04
(58) Field of Classification Search ............. 379/220.01, 379/230, 88.17; 709/219, 206, 227
See application file for complete search history.

(56) References Cited

U.S. PATENT DOCUMENTS

| 5,638,430 | A  | * | 6/1997  | Hogan et al. .............. 379/114.14 |
| 6,256,516 | B1 | * | 7/2001  | Wagner et al. ................. 455/565 |
| 6,839,421 | B2 | * | 1/2005  | Ferraro Esparza et al. ........................ 379/220.01 |
| 6,865,266 | B1 | * | 3/2005  | Pershan ................... 379/221.13 |
| 6,947,738 | B2 | * | 9/2005  | Skog et al. ................. 455/426.1 |
| 6,968,050 | B1 | * | 11/2005 | Pershan et al. ................. 379/196 |
| 7,027,582 | B2 | * | 4/2006  | Khello et al. ............. 379/220.01 |
| 7,320,026 | B2 | * | 1/2008  | Adamczyk .................... 709/219 |
| 2002/0076027 | A1 | * | 6/2002 | Bernnan et al. .......... 379/211.01 |

FOREIGN PATENT DOCUMENTS

| WO | WO 97/25849 A | 7/1997 |
| WO | WO 97/31490 A | 8/1997 |

(Continued)

OTHER PUBLICATIONS

RFC 3026.*

(Continued)

*Primary Examiner* — Curtis Kuntz
*Assistant Examiner* — Joseph J Nguyen
(74) *Attorney, Agent, or Firm* — Cohen Pontani Lieberman & Pavane LLP

(57) ABSTRACT

A method and device for sending a request (R) from a requesting machine (H) to a domain name server (1, 2, 3). A prior test of the validity of the destination telephone number (NTEL) of the request (R) is executed automatically and locally to the requesting machine (H) relative to a database (BD) local to said requesting machine (H) in order to forward the request (R) from the requesting machine (H) to the domain name server (1, 2, 3) only if its telephone number (NTEL) passes said test.

15 Claims, 4 Drawing Sheets

FOREIGN PATENT DOCUMENTS

| | | |
|---|---|---|
| WO | WO 01/13259 A | 2/2001 |
| WO | WO 02/15051 A | 2/2002 |
| WO | WO 02/19649 A | 3/2002 |

OTHER PUBLICATIONS

RFC 2916.*

RFC 2602.*

Faltstrom, "E.164 number and DNS", Request for Comments 2916, pp. 1-10, Sep. 2000.*

RTR-GmbH:, "Rahmenbedingungen Der RTR-GMBH Für Den Enum Field Trial in Österreich, Version V 1.0", Online, URL:http://www.rtr.at/web.nsf/lookuid/5AAE80558D137482C1256E620061BCD1/$file/RTR%2ORahmenbedingungen%2OV%201.0.pdf, p. 7, line 1, Nov. 2002.*

* cited by examiner

| CC | Nat | BN | CAR | | | | | | | Op | Memo | Geo | Inf | ENUM? |
|----|-----|-----|------|------|------|------|------|------|------|----|------|-----|-----|-------|
| | | | Eres | Baff | Eaff | Lmax | Lmin | Batt | Eatt | | | | | |
| 33 | AT | 10050 | 01/01/2005 | 01/01/2004 | 01/01/2005 | 9 | 9 | unknown | unknown | | | | | yes |
| 33 | AT | 14528 | 01/01/2002 | 01/01/2001 | 01/01/2002 | 9 | 9 | 01/01/2001 | 01/01/2002 | | | | | yes |
| 33 | AT | 14529 | 01/01/2004 | 01/01/2002 | 01/01/2004 | 9 | 9 | 01/01/2002 | 01/01/2004 | | | | | yes |
| 33 | AT | 14530 | 01/01/2004 | 01/01/2003 | 01/01/2004 | 9 | 9 | 01/01/2003 | 01/06/2003 | | | | | no |
| 33 | AT | 620 | unknown | unknown | unknown | 9 | 9 | unknown | unknown | | | | | yes |
| 33 | AT | 630 | 01/08/2004 | unknown | unknown | 9 | 9 | unknown | unknown | | | | | no |
| ... | ... | ... | | | | | | | | | | | | | though by the invention is not found except by

METHOD AND DEVICE FOR TRANSMITTING REQUESTS FROM A REQUESTING MACHINE TO A DOMAIN NAME SERVER

RELATED APPLICATIONS

This is a U.S. National Phase Application under 35 USC 371 of International Application PCT/FR2004/003123, filed on 3 Dec. 2004.

FIELD OF THE INVENTION

The invention relates to a method of sending at least one request to a domain name server from a requesting machine.

BACKGROUND OF THE INVENTION

The domain name servers (DNS) to which the invention more particularly relates reproduce telephone numbers such as E.164.arpa numbers.

In these servers, each name is determined from the E.164 format destination telephone number contained in the request coming from the requesting machine. Each domain name server includes records in memory associated with names and areas that it manages and/or references to other domain name servers for names and areas that it does not manage.

According to the ENUM protocol, when a message requesting to read a name reaches a server managing the area that might contain that name, the server returns to the requesting machine the records that are associated with that name and that consist of resource identifiers (URI) such as a fax number, a mobile telephone number, an electronic mail address, for example.

Accordingly, name servers may receive many read and write requests, including erroneous requests for which the name does not exist in the domain name servers.

In the event of a request for an unknown domain name, in some circumstances the domain name server may not respond to the requesting machine. The fact that the requested name does not exist can then be detected only if a time-out from the requesting machine sending the request to failure to receive any response expires. Also, processing erroneous requests overloads and slows down the processing of valid requests by the name servers, which is a problem that must be addressed.

SUMMARY OF THE INVENTION

One object of the invention is to provide a method and a device for sending requests to a domain name server that alleviate the drawbacks of the prior art and reduce the number of erroneous requests that domain name servers have to process.

This and other objects are attained in accordance with one aspect of the invention directed to a method of sending at least one request to a domain name server from a requesting machine, said domain name server being an E.164.arpa telephone number domain name server and each name being determined from an E.164 format destination telephone number contained in said request. A prior test of the validity of the destination telephone number of the request is executed automatically and locally to the requesting machine relative to a telephone number database local to the requesting machine in order to forward the request from the requesting machine to the domain name server only if its destination telephone number passes said test.

By means of the invention, recourse to the domain name servers is limited and they are relieved of pointless processing. An erroneous request from a requesting machine is recognized as such, and prevented from reaching the name servers, by determining that the destination telephone number of the request is invalid, for example by determining that it is impossible for that number to exist.

According to other features of the invention:

at least one prescribed country code is stored in the local database and said test includes verifying whether the country code of the destination telephone number of the request is stored in the local database;

at least one numbering plan is stored in the local telephone number database, the numbering plan or each numbering plan comprising at least one block of telephone numbers, and said test includes a step of determining whether the destination telephone number of the request belongs to a block of numbers of the numbering plan, the destination telephone number of the request failing said test if the result of the determination step is a negative result;

the numbering plan is associated with a country code and the numbering plan corresponding to the country code of the destination telephone number of the request is that in relation to which said test is effected;

separate blocks of telephone numbers associated with respective prescribed characteristics of numbers in the block are stored in the local database and said determination step further comprises a step of determining to which block of telephone numbers of the local database the destination telephone number of the request belongs, and if it is determined that the destination telephone number of the request belongs to a block of the numbering plan the characteristics associated with the block thus determined are read in the local database, it is verified whether the destination telephone number of the request conforms to the characteristics thus read, and the request is forwarded from the requesting machine to the domain name server only if the verification result is a positive result;

the characteristics of the block numbers are at least one of the following:
  a date of reservation of telephone numbers of the block;
  an end of period of reservation of telephone numbers of the block;
  a date of assignment of telephone numbers of the block;
  an end of period of assignment of telephone numbers of the block;
  a date of allocation of telephone numbers of the block;
  a date of end of allocation of telephone numbers of the block;
  a maximum length of the telephone numbers of the block;
  a minimum length of the telephone numbers of the block;

if the destination telephone number of the request fails said test, a signal is sent to the requesting machine to report an error in the destination telephone number of the request;

the signal reporting the error in the destination telephone number of the request contains information on the block number characteristic(s) to which the destination telephone number of the request does not conform at the time of said verification.

Another aspect of the invention is directed to a device for sending at least one request to a domain name server from a requesting machine, said domain name server being an E.164.arpa telephone number domain name server and each name being determined from an E.164 format destination telephone number contained in said request. The device is local to the requesting machine and includes means for receiving requests from the requesting machine, a telephone number database, means in the receiver means for automatically testing the validity of the destination telephone number of the request against data from the telephone number database, and means for forwarding the request from the requesting machine to the domain name server only if the control means determine that its destination telephone number has passed said validity test.

According to a feature of the invention, the receiver means, the telephone number database, the automatic control means, and the sending means are in the requesting machine.

According to another feature of the invention, the receiver means, the automatic control means, and the sending means are in the requesting machine and the automatic control means can consult the telephone number database via a local area network.

BRIEF DESCRIPTION OF THE DRAWINGS

The invention will be better understood after reading the following description, which is given by way of non-limiting example only and with reference to the appended drawings, in which.

DETAILED DESCRIPTION OF THE DRAWINGS

Figure 1:
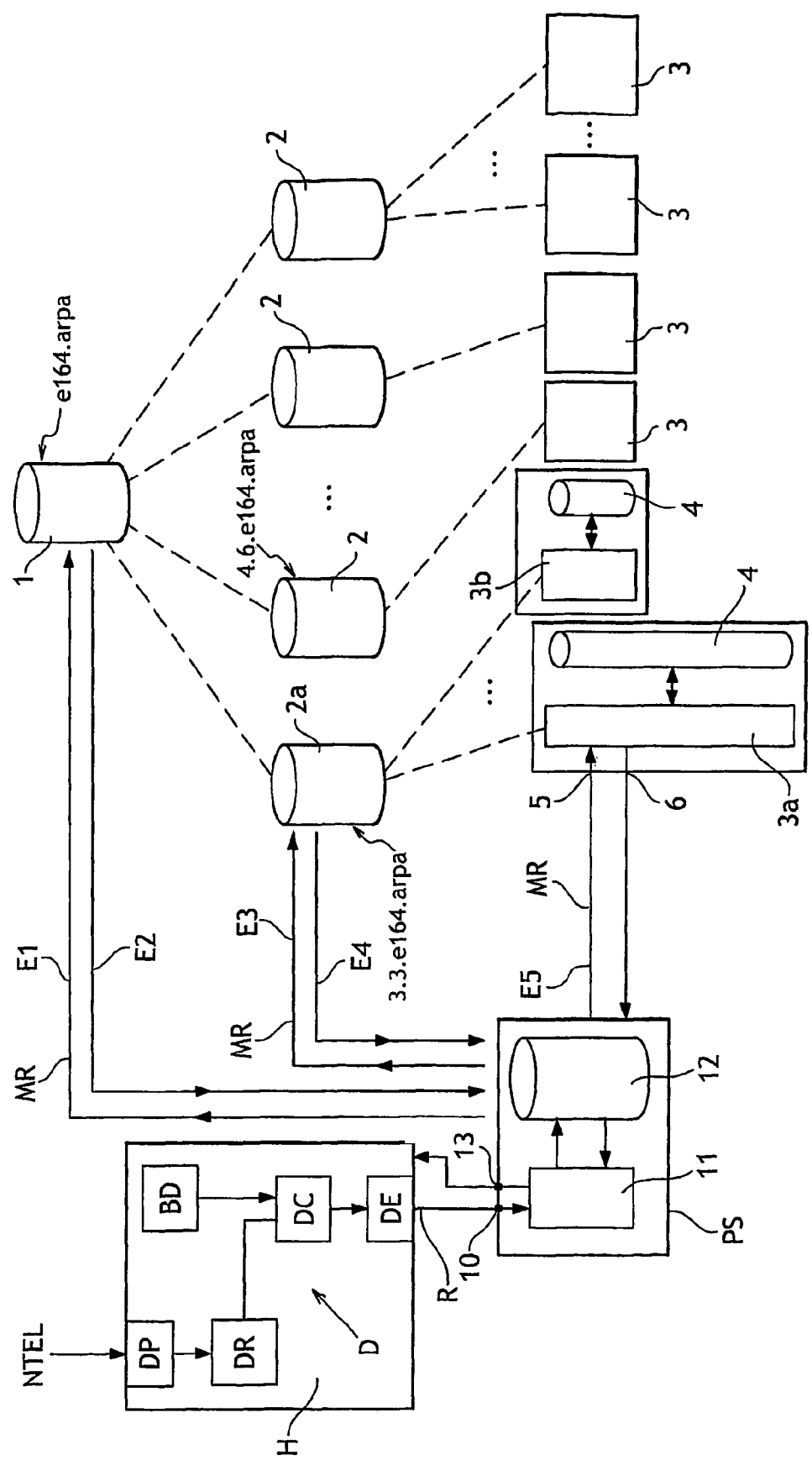
FIG. 1 is a diagram of a device of the invention for sending requests to a domain name server architecture.
Figure 2:
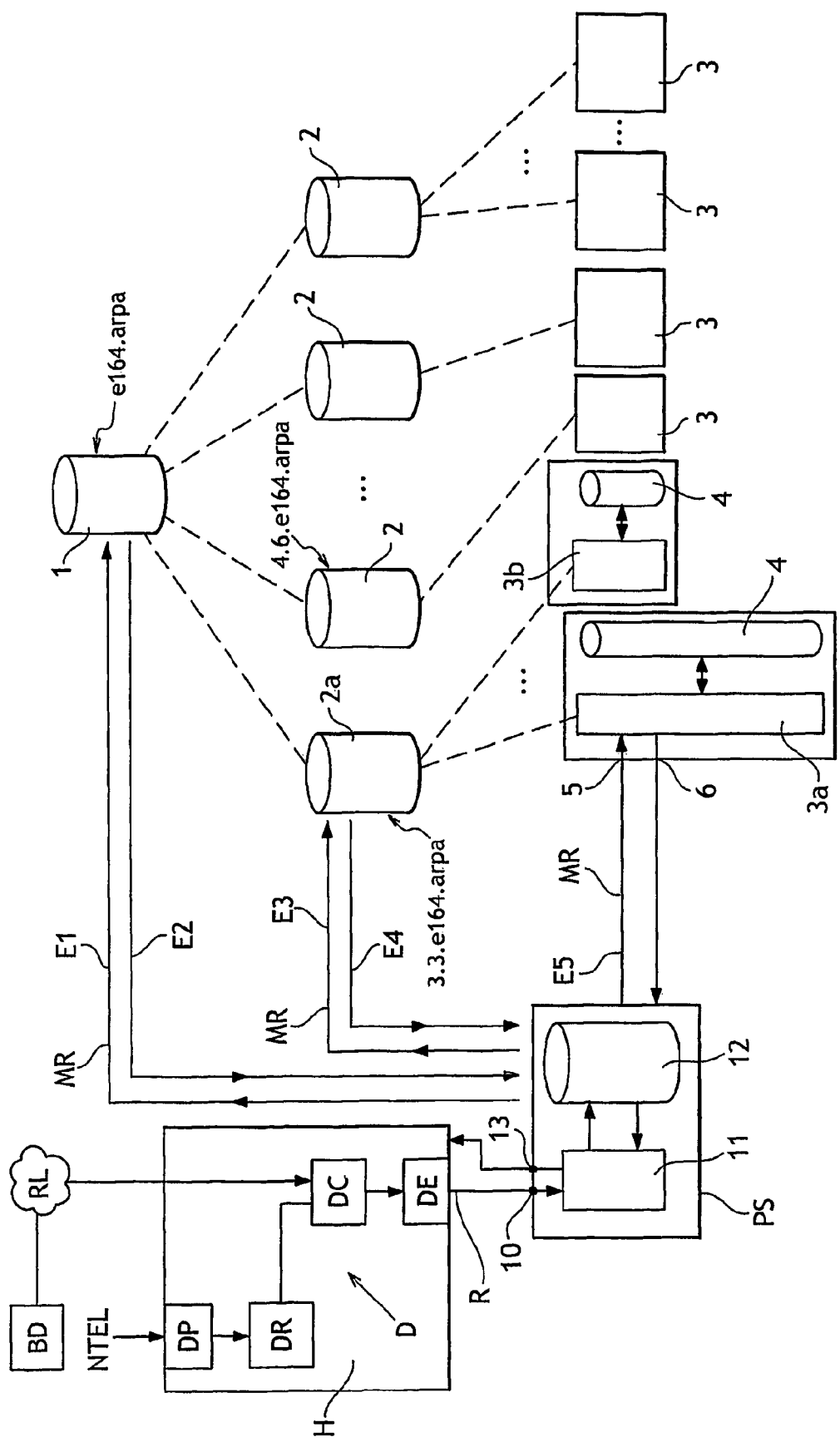
FIG. 2 is a diagram of a variant of the FIG. 1 request sending device.
Figures 3, 4:
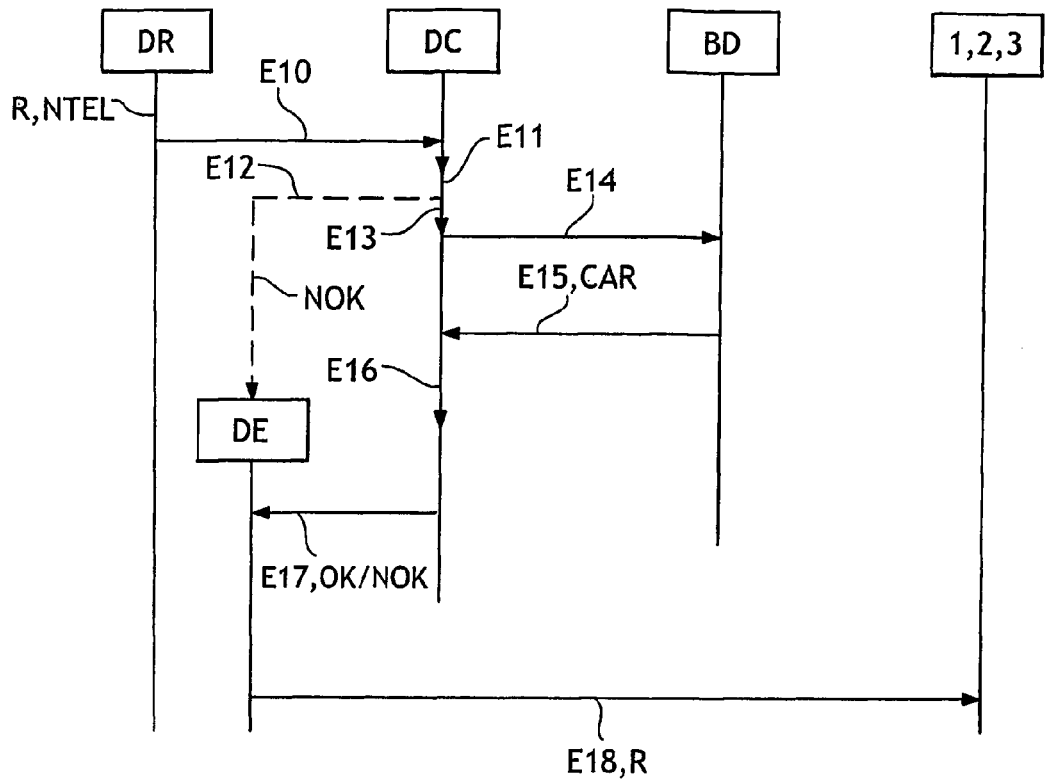
FIG. 3 represents a flowchart of one example of a method of sending requests used by the device of the invention.
FIG. 4 represents one example of the content of a database used by the invention.

In the FIG. 1 telephone number domain, the names in domain name servers 3 utilize the users' telephone numbers, in accordance with the ENUM protocol of the Telephone Number Mapping Working Group of the Internet Engineering Task Force (IETF) defined in the Request For Comments document RFC2916, to which reference is made here (the IETF Request For Comments documents are reference documents relating to the Internet). According to the document RFC2916 "E.164 Number and DNS", to translate an E.164 telephone number into a domain name, all non-numeric characters are removed from the user's E.164 telephone number, which includes the country code (e.g. +33-1-45295813 in the case of the telephone number of a user in France), periods are inserted between the digits, the order of the digits is reversed, and the string "e.164.arpa" is added at the end of the string of digits, to obtain the domain name, which is therefore 3.1.8.5.9.2.5.4.1.3.3.E.164.arpa in the present example, which FIGS. 1, 2 and 3 illustrate.

In a memory 4 associated with the domain name server 3 the name is associated with a set of Naming Authority Pointer Resource (NAPTR) records (see IETF document RFC2915, superseded by the document RFC3403, to which reference is made here). According to part 4 of IETF document RFC3403, the NAPTR record has a DNS type code equal to 35 for the TYPE field of the resource record format specified in section 3.2.1 of IETF document RFC1035. The NAPTR record therefore has the following format:

ORDER, PREFERENCE, FLAGS, SERVICES, REGEXP, REPLACEMENT.

The REGEXP field contains information I as such, for example information I for contacting the user, e.g. sip:dupont@ft.com, mailto:dupont@ft.com, http://www.exemple.fr, which in this example constitutes other information for contacting a person by the name of Dupont whose telephone number is +33-1-45295813 (this is the international format for the French telephone number 01 45 29 58 13).

Thus in this example the records associated with this domain name will be:

$ORIGIN 3.1.8.5.9.2.5.4.1.3.3.E.164.arpa
   IN NAPTR 10 10 "u" "E2U+sip" "!*.*$!sip:dupont@ft.com!"
   IN NAPTR 10 20 "u" "E2U+mailto" "!^.*$!mailto:dupont@ft.com!"
   IN NAPTR 10 20 "u" "E2U+http://www.exemple.fr!"

Furthermore, the delegation principle of the ENUM architecture in the context of E.164 number management defines a plurality of levels of responsibility in a tree structure in the sense that a first domain name server 1 (Tier 0) manages an "e.164.arpa" worldwide address root, second domain name servers 2, 2a (Tier 1) to which the first server 1 sends each manage a country code (for example 6.4E.164.arpa for Sweden, 3.3.E.164.arpa for metropolitan France), and third domain name servers 3, 3a, 3b (Tier 2) constitute the aforementioned domain name servers 3, each managing its associated domain names area. In FIG. 1, the send paths are symbolized by dashed lines. Each of the domain name servers 2, 2a sends to one or more domain name servers 3, 3a, 3b to which the other servers 2, 2a do not send. The server 1 is called the parent of the servers 2, 2a, which are in turn the parents of the servers 3, 3a to which they send. Each server 3, 3a, 3b manages the area associated with E.164 numbers.

In the above example, the 3.3.E.164.arpa domain name server 2a sends domain names to a plurality of servers 3a, 3b. For example, the domain name server 3a manages a certain number of 3.3.E.164.arpa addresses, including for example the address 3.1.8.5.9.2.5.4.1.3.3.E.164.arpa, and is associated with the memory 4 in FIG. 2. For example, the server 3a manages an area terminating at 9.2.5.4.1.3.3.E.164.arpa and the server 3b manages an area terminating at 8.2.5.4.1.3.3.E.164.arpa.

A machine H seeking to obtain information I present in a record ENR of the architecture A sends to a service platform PS (see FIGS. 1 and 2) a request R containing an E.164 telephone number NTEL, enabling the name ADR of that record ENR to be determined by translating the telephone number NTEL as explained above. The requesting machine H is a user's personal computer, for example. The service platform PS has a client-server architecture, for example, and has a port 10 for receiving external requests R from machines H and a resolver module 11 for processing requests received via the port 10. As a function of the architecture, requests validated by the system may be sent by a local DNS over the network of the requesting client. Requests coming from the service platform are therefore sent over that local area network. The resolver module 11 is a client of a local domain name server 12 connected to the module 11 and is adapted to forward to the local domain name server 12 connected to the module 11 enquiry signals corresponding to requests R received via the port 10. The local domain name server 12 is adapted to forward messages MR requesting information I to the external domain name servers 1, 2, 3 in the following manner and as a function of the enquiry signals.

The request messages MR include the name ADR of the domain to be consulted in the architecture to obtain the required record ENR.

The request R sent by the machine H to the platform PS gives the E.164 telephone number NTEL that is required, which the platform PS translates (for example by means of the resolver module 11) into a name ADR to be consulted (e.g. ADR=3.1.8.5.9.2.5.4.1.3.3.E.164.arpa for NTEL=+33-1-45295813), to form the corresponding request message MR.

The request message MR containing the name ADR is first sent to the server 1 in the step E1, and the server 1 then sends a first response message to the local server 12 in the step E2, this response message including a reference to the corresponding server 2 selected on the basis of that address ADR, i.e. the server 2a in the present example. Then, in the step E3, the local server 12 sends the request message MR containing the name ADR to the selected server 2 indicated in the first response message, i.e. to the server 2a in the present example, and then, in the step E4, the server 2a sends a second response message to the local server 12 including a reference to the corresponding server 3 selected on the basis of the name ADR, i.e. the server 3a in the present example. Then, during the step E5, the local server 12 sends the request message MR containing the name ADR to the selected domain name server 3a indicated in the second response message.

Each server 3a, 3a, 3b has at least one input 5 for request messages MR. The request messages MR may be, for example, requests to read information I at the name ADR or requests to write information I at the name ADR.

When a message MR requesting to read at the name ADR reaches the input 5, if the name ADR is found in the server 3, 3a, 3b, the NAPTR record(s) constituting the information I are looked for at the name ADR. If the NAPTR records associated with the name ADR are found in the server 3, 3a, 3b, they are read in the associated memory 4, for example the NAPTR records indicated above for the name 3.1.8.5.9.2.5.4.1.3.3.E.164.arpa. The server 3, 3a, 3b has a first output 6 that supplies a third response message to the read request message MR received at its input 5. This third response message contains the NAPTR records read in the memory 4 associated with the name ADR specified in the read request message MR, like those indicated in the example referred to above, supplying the information I=sip:dupont@ft.com, mailto:dupont@ft.com, http://www.exemple.fr for the name 3.1.8.5.9.2.5.4.1.3.3.E.164.arpa. In the step E6, the third response message is sent from the output 6 of the server 3a to the local server 12 and from there to the requesting machine H via its port 13.

When a message MR requesting reading at the name ADR reaches the input 5, if the name ADR is found in the server 3, 3a, 3b, and if the NAPTR record(s) of the information I are looked for at that name ADR but no NAPTR record is found at that name ADR (because there is no NAPTR record at that name ADR), the server 3 sends a response message indicating the absence of NAPTR records at the name ADR via its output 6 to the local server 12 and from there to the requesting machine H.

If a message MR requesting reading at an erroneous name ADR reaches the input 5, that name ADR will not be found in the server 3 because that name does not exist in the domain name servers. For various reasons (unavailability or overloading of the servers, routing table configurations), the time to resolve the name ADR may be longer, and as no response is sent during this time the local server 12 will never receive a response to the last request message MR it sent.

According to the invention, a device D local to the requesting machine H is provided for forwarding requests R to the external domain name servers 1, 2, 3, the servers 3 being those containing NAPTR records.

The above description concerning messages MR requesting reading is of course valid for messages MR requesting writing of a NAPTR record specified in the request R in the servers 1, 2, 3 at the name ADR also specified in the request R.

The forwarding device D includes means DR for receiving requests R from the requesting machine H and a telephone number database BD. Control means DC are provided in the forwarding device D for checking automatically if the destination telephone number NTEL of the request R is valid in relation to data from the telephone number database BD.

Means DE are provided for forwarding the request R from the requesting machine H to the domain name server 1, 2, 3 only if the destination telephone number NTEL of that request R passes a test carried out beforehand by the control means DC. The control means DC form part of a validation library that can also include other functions, for example.

The forwarding device D is installed entirely on the requesting machine H, for example, as shown in FIG. 1, in which case the receiver means DR consist, for example, of an interface for receiving requests R coming from an interface DP, enabling the user to produce one or more requests R on the requesting machine H by entering on the machine the destination telephone number(s) NTEL for the request(s) R concerned.

In the variant shown in FIG. 2, the receiver means DR, the automatic control means DC and the forwarding means DE are in the requesting machine H, as before, and the automatic control means DC can consult the telephone number database BD via a local area network RL. In this variant, the database BD is in the resolver module 11, for example.

If the destination telephone NTEL of the request R is declared invalid when tested against data from the database BD, the request R is not forwarded by the means DE of the requesting machine H to the resolver module 11. The validity test therefore eliminates request messages MR in respect of which it can be determined a priori that they cannot have an associated NAPTR record in the external domain name servers 1, 2, 3, because the corresponding destination telephone number NTEL is not valid. Consequently, no request message MR specifying a name ADR obtained by translating the telephone number NTEL will be generated by the local server 12 or sent by it to the external domain name servers 1, 2, 3, which will therefore be relieved of receiving messages MR with erroneous names ADR and of pointless processing of such messages.

The telephone numbers NTEL have the following format:

$$CC\ C_1C_2C_3\ldots C_P$$

in which CC is the international DOD country code assigned by the ITU comprising 1, 2 or 3 digits (33 for metropolitan France, 362 for Reunion, 44 for the United Kingdom, 1 for the United States, etc.) and CC $C_1C_2C_3\ldots C_P$ is the telephone number NTEL in the national numbering plan. The country code may be geographical or non-geographical. In the present example, CC is 33 and $C_1C_2C_3\ldots C_p$ is 145295813.

For example, at present, in France, p is 9 and CC $C_1C_2 C_3\ldots C_P$ is Zabpqmcdu, where Z is 1, 2, 3, 4, 5, 6 or 8, the 0 being added for DOD from metropolitan France.

The country code CC is explicitly present in the number NTEL, having been dialed by the user, or, failing this, is implicitly considered to be that of the country in which the requesting machine H is located or is inserted by the application.

In one embodiment, one or more national number plans each associated with the corresponding country code is or are stored in the local telephone number database BD. The control means DC test the number NTEL against the country code CC and reject the request R if the result is negative (and send the message (4), (7) or (8) described below, for example); if the test indicates that the country code CC of the telephone number NTEL is one of the codes in the database BD, the telephone number NTEL is tested against the number plan corresponding to the country code CC of the destination telephone number NTEL of the request R present in the means DR. According to the invention, the country code CC of the telephone number NTEL could of course be tested on its own to eliminate requests based on codes that do not correspond to a country having a country code stored in the database (and to send the message (4), (7) or (8) described below, for example).

Each numbering plan includes one or more blocks BN of telephone numbers that may be delimited in the above (French) example by a certain number of the digits at the beginning of the telephone number, such as the national root Zabpq; a number belongs to the block BN if the first digits of the number, excluding the country code CC, are the same as those of the block BN. However, any other logical rule governing a number belonging to a block may be used, a number belonging to only one block and the blocks of the same numbering plan being separate. Accordingly, a block generally designates a resource of the numbering plan and contains one or more telephone numbers that are not necessarily in sequence. Thus the number 145295813 belongs to the block 14529 but not to the block 10050.

These blocks are assigned to one of the telephone operators.

In one embodiment of the invention, prescribed block number characteristics CAR associated with each block BN are stored in the local database BD.

In FIG. 3, the sending method of the invention proceeds as follows, for example.

In the step E10, a request R containing the destination telephone number NTEL is received by the receiver means DR and forwarded to the control means DC.

In the step E11, the control means DC then determine whether the destination telephone number NTEL of the request R belongs to one of the blocks BN of the corresponding national numbering plan in the database BD. If it is determined that the destination telephone number NTEL of the request R does not belong to any block BN, then the telephone number NTEL fails the test, and the control means DC report this to the means DE, in the step E12 represented in dashed line in FIG. 3, by means of a refusal message NOK, as a result of which the means DE do not forward any request R containing that destination telephone number NTEL to the external domain name servers 1, 2, 3. Consequently, the means DE do not forward requests R containing a destination telephone number NTEL that does not belong to any of the blocks BN. At present, for example, no block BN for France begins with the digit 7 (there are no French telephone number that begin with 07), and no French telephone number NTEL beginning with 07 will pass the test applied by the control means DC.

If it is determined in the step E11 that the destination telephone number NTEL of the request R belongs to one of the blocks BN of the database BD, in the next step E13 the control means DC determine to which block BN of the database BD the destination telephone number NTEL of the request R belongs.

Then, during a reading step E14, the means DC automatically consult the local database BD to determine the characteristics CAR associated with the determined block of numbers BN, and in the next step E15 the local database BD sends to the means DC the characteristics CAR associated with the block of numbers BN thus determined.

Then, in the step E16, the control means DC verify if the destination telephone number NTEL of the request R conforms to said characteristics CAR received from the database BD. If so, in the next step E17 the control means DC send a message OK accepting the request R to the means DE, that acceptance message OK triggering forwarding of the request R from the means DE to the external domain name servers 1, 2, 3 in the next step E18. If not, in the next step E17 the control means DC send a message NOK rejecting the request R to the means DE, this rejection message NOK preventing forwarding of the request R from the means DE to the external domain name servers 1, 2, 3. The means DE therefore do not forward the request R from the requesting machine H to the external domain name servers 1, 2, 3 unless the means DC establish that the destination telephone number NTEL of the request R conforms to said characteristics CAR received from the database BD in which they are associated with the block BN to which the number NTEL belongs.

The tests are carried out automatically.

As shown in FIG. 4, the block number characteristics CAR are, for example:

Eres: end of period of reservation of telephone numbers of block BN;
Baff: date of assignment of telephone numbers of block BN (e.g. for a company);
Eaff: end of period of assignment of telephone numbers of block BN;
Lmax: maximum length of telephone numbers of block BN;
Lmin: minimum length of telephone numbers of block BN;
Batt: date of beginning of allocation of a block BN of telephone numbers;
Eatt: date of end of allocation of a block BN of telephone numbers;
Op: operator identifier;
Geo: geographical area;
Inf: other information.

The reservation of a resource (block) in a numbering plan is a decision taken by an authority administering the plan, for example a national authority like the Autorité de Régulation des Télécommunications (ART) in France, or an international authority like the International Telecommunications Union (ITU), to grant to an entity (telecommunications operator, service provider, private person), for a limited period (ending at Eres), an option on the future use of that numbering resource, which can then be neither reserved nor allocated to another party.

The allocation of a resource in a numbering plan is a decision taken by the authority administering the plan to grant an entity the right to use the resource from Batt to Eatt.

The assignment of a resource in a numbering plan consists in making it available by the entity allocating the resource to an end user, possibly in the context of the provision of a commercial service.

The number NTEL conforms to Eres if the current date of the request R is before Eres. The number NTEL conforms to Baff if the current date of the request R is after Baff. The number NTEL conforms to Eaff if the current date of the request R is before Eaff. The number NTEL conforms to Lmax if the length of NTEL is less than or equal to Lmax. The number NTEL conforms to Lmin if the length of NTEL is greater than or equal to Lmin. The number NTEL conforms to Eatt if the current date of the request R is before Eatt. The assignment date Baff shows whether the number NTEL is in use or will soon be in use.

Consequently, a request R received by the means DR on 10 Dec. 2003 and containing a number NTEL determined by the control means DC to belong to the block 14528 will fail the test, given that the date is after Eres (Jan. 1, 2002), as indicated in FIG. 4, and the forwarding means DE of the machine H will not forward the corresponding request R to the external domain name servers 1, 2, 3. The message (14) described below will be sent, for example.

On the other hand, a request R received by the means DR on 10 Dec. 2003 and containing a number NTEL determined by the control means DC to belong to the block 14529, such as the number 33 145295813, will pass the test because it complies with the corresponding conditions, as indicated in FIG. 4, and the forwarding means DE of the machine H will forward the corresponding request R to the external domain name servers 1, 2, 3.

The number plan or plans of the database BD can be updated by any appropriate means in respect of the blocks BN and each of the characteristics CAR.

In one embodiment of the invention, the control means DC send a signal reporting an error in the destination telephone number NTEL in the request R to the user interface DP of the requesting machine H if the destination telephone number NTEL of the request fails the test, for example including information on the block number characteristic(s) CAR that the destination telephone number NTEL of the request R does not comply with.

The error messages may be as follows, for example:
(1) length of number must be from "Lmin" to "Lmax";
(2) block "BN" not assigned but reserved until "Eres";
(2a) code reserved but not assigned;
(3) block neither reserved nor allocated;
(3a) does not belong to a block;
(4) country code CC not allocated;
(5) non-ENUM number for a country code CC for which a specific ENUM block has been defined;
(6) E.164 format incorrect (non-numeric): integer of maximum length 15 required;
(7) country code CC allocated only temporarily or for test purposes;
(8) country code CC not referenced in international number reference library;
(9) start of allocation date (Batt) number error;
(10) end of allocation date (Eatt) number error;
(11) beginning of assignment date (Baff) number error;
(12) block not assigned by operator.

The characteristics CAR may further include a numbering plan field Nat taking the value Res (reserved), Test (allocated for test purposes), NA (not assignable) or AT, the same value of the field Nat being valid for the same numbering plan and therefore for all the blocks BN of that numbering plan. Together with their associated characteristics CAR, codes and associated fields, the blocks BN form rows in the database BD, as shown in FIG. 4.

Verifications may be carried out, for example as described below and represented in continuous line in FIG. 5.

Verifications may first be performed with respect to international telephone data from the database BD, in the steps V1, V2, V3, V4, V5, V6 described below, then with reference to national telephone data from the database BD, in the steps V7, V8, V9, V10, V11, V12 described below, and then with reference to operator data in the steps V13, V14 and subsequent steps.

For example, the verification V1 of the number NTEL performed first determines if it has a numeric format and does not begin with zero, the message (5) being sent in the event of a negative result and a positive result leading to the verification V2, taking account (in the step T1) of the whole of the database BD, which is also referred to as the table T in respect of the rows of the database BD on which the verifications are performed.

The verification V2 verifies if there is at least one row in the database BD beginning with the country code CC of the number NTEL, the message (8) being sent in the event of a negative result and a positive result leading to the verification V3, taking account (in the step T2) only of the rows of the table T that begin with the country code CC of the number NTEL (for example by eliminating all the rows in the table T that do not begin with CC, so that the table T contains only rows of the same numbering plan).

The verification V3 verifies if the field Nat of a block BN of the table T, for example the first row of the table T, contains the value Res, and if this is so, the verification V4 verifies if the field Eres of that row has been filled in; if so the message (2a) is sent and if not the message (4) is sent.

If the result of the verification V3 is negative, the verification V5 verifies if the field Nat of the block BN of the number NTEL contains the value Test; if so the message (7) is sent and if not the verification V6 is performed.

The verification V6 verifies if the field Nat of the block BN of the number NTEL contains the value NA; if so the message (7) is sent and if not the verification V7 is performed.

The verification V7 verifies if the field Nat of the block BN of the number NTEL contains the value NA; if so the message (7) is sent and if not the verification V7 is performed.

In the first example, the database BD comprises ranges of numbers (defined by one or more blocks BN) defined as comprising ENUM numbers and other ranges of numbers (also defined by one or more blocks BN) defined as not comprising ENUM numbers, as represented in FIG. 4 by the field "ENUM?" respectively containing 'yes' or 'no' for those ranges of numbers.

The verification V7 verifies if there exist in the table T one or more rows having a field ENUM? containing 'yes'. If so, there is taken into account during the step T3 only of rows in the table T whose ENUM? field contains 'yes', i.e. of rows of blocks of ENUM numbers (this is achieved, for example, by eliminating from the table T all rows having an ENUM? field containing 'no'). Rows whose blocks do not correspond to the first digits of the number NTEL are then eliminated from the table T during the step T4 in order to select the block BN in the table T to which the number NTEL belongs (see the step E11 described above). In the event of a positive result of the verification V7, and after the steps T3 and T4, the verification V8 verifies if the table T is empty, i.e. does not belong to a block BN of ENUM numbers; if so the message (5) is sent. The message (5) reflects the fact that the number NTEL corresponds to a range of numbers in the database BD (defined by one or more blocks BN, for example) defined as not comprising any ENUM numbers. In the event of a negative result of the verification V8, the verification V10 is performed.

A negative result of the verification V7 leads to the step T4 of selecting the block in the table T to which the number NTEL belongs. The verification V9 is then performed to determine if the table T is empty, i.e. if a block BN of this kind exists in the database BD; the message 3a is sent in the event of a positive result and in the event of a negative result the verification V10 is performed.

The steps E13, E14 and E15 are executed to perform the verification V10.

The verification V10 relates to the conformance of the number NTEL to Lmin and to Lmax, the message (1) being sent in the event of a negative result and the verification V11 being performed in the event of a positive result.

The verification V11 relates to the conformance of the number NTEL to Batt, the message (9) being sent in the event of a negative result and the verification V12 being performed in the event of a positive result. The message (9) is sent if the beginning of assignment date Batt has not been filled in or is after the current date of the verification V11.

The verification V12 relates to the conformance of the number NTEL to Eatt, the message (10) being sent in the event of a negative result and the verification V13 being performed in the event of a positive result. The message (10) is sent if the end of assignment date Eatt has been filled in and is before the current date.

The verification V13 relates to the conformance of the number NTEL to Baff, the message (11) being sent in the event of a negative result and the verification V14 being performed in the event of a positive result. The message (11) is sent if the beginning of assignment date Baff has been filled in and is after the current date.

The verification V14 determines if the beginning of assignment date Baff has the value 0; if not the message (12) is sent.

Of course, other verifications may be performed with respect to operator data, such as those referred to below.

An unallocated dedicated tranche message (13) is sent if a block BN contains a reservation date Eres that is before the current date.

An end of assignment date Eaff number error message (14) is sent if there is an end of assignment date Eaff that is before the current date.

The message (2) indicates that the block BN containing the number NTEL contains no dates Baff and Eaff but does contain a date Eres, as is the case for the block 630 in FIG. 4.

The message (3) indicates that the block BN containing the number NTEL contains no date Eres or allocation dates Batt and Eatt, as is the case for the block 620 in FIG. 4.

Figure 5:
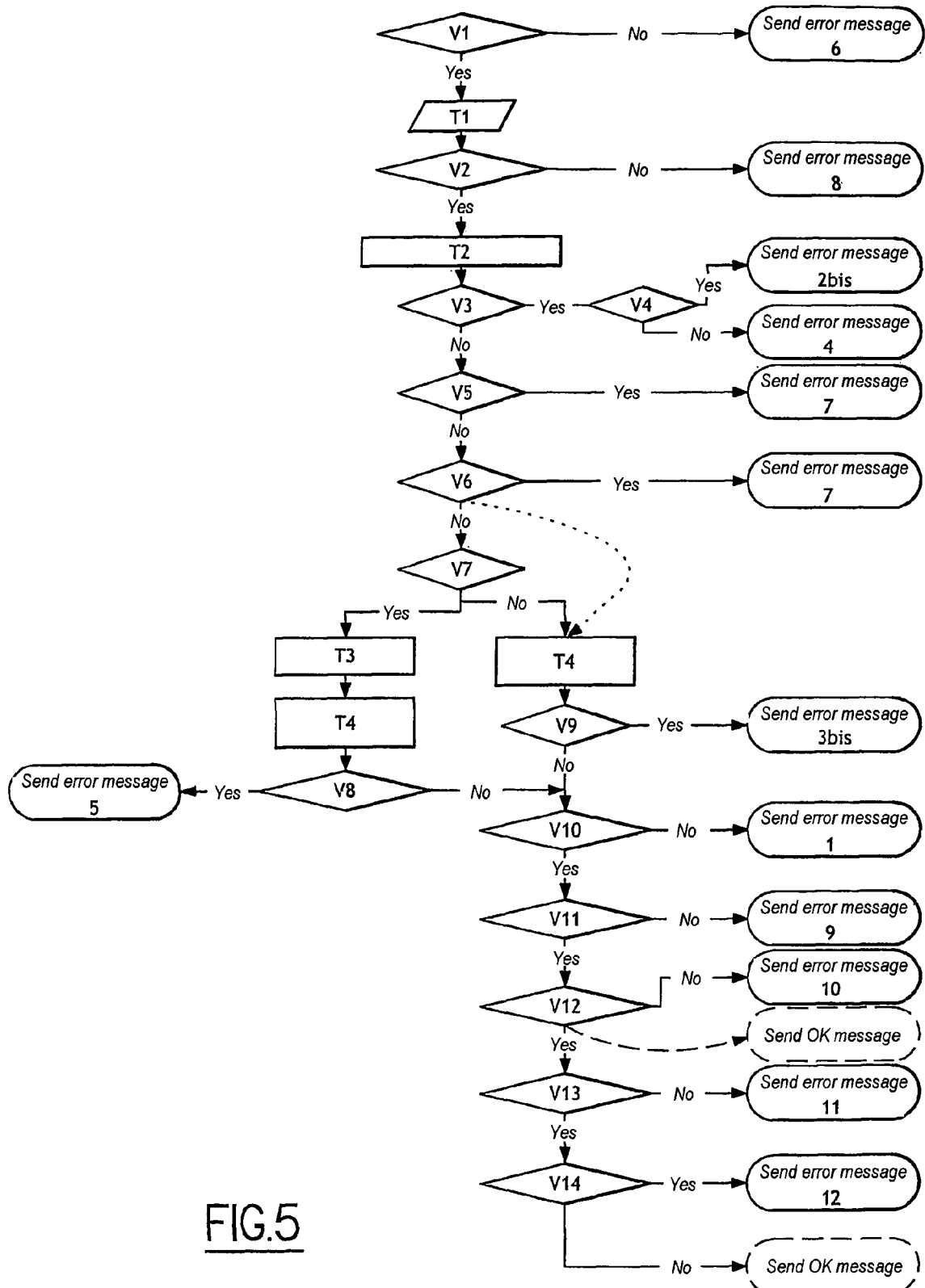
FIG. 5 represents two flowcharts of examples of verification steps of the method of the invention.

In a second example, the verifications and steps V7, T3 and V8 are not executed and a negative result of the verification V6 leads directly to the step T4 followed by the verification V9, and the verifications stop at V12, as represented in dashed line in FIG. 5.

In the first and second examples, if all the verifications give a positive result for the number NTEL and no error message has been sent, the acceptance message OK is sent in the step E17.

The steps of the method described above are executed by an electronic data processing device, in this instance the device in the requesting machine for forwarding requests to the DNS, under the control of the instructions of a computer program. Consequently, the invention also concerns a computer program adapted to be stored in or transmitted by a data medium and comprising program instructions for executing the method on an electronic data processing device. The data medium may be a hardware storage medium, for example a CD-ROM, a magnetic diskette or a hard disk, or a transmissible medium such as an electrical, optical or radio signal.

The invention claimed is:

1. A method of sending at least one request to a domain name server from a requesting machine, said domain name server being an E.164.arpa telephone number domain name server and each name being determined from an E.164 format destination telephone number contained in said request,
   wherein a prior test of the validity of the destination telephone number of the request is executed automatically and locally to the requesting machine relative to a telephone number database local to the requesting machine to forward the request from the requesting machine to the domain name server only if its destination telephone number passes said test;
   wherein at least one numbering plan is stored in the telephone number database local to the requesting machine, the numbering plan or each numbering plan comprising at least one block of telephone numbers, and said test includes a step of determining whether the destination telephone number of the request belongs to a block of numbers of the numbering plan, the destination telephone number of the request failing said test if a result of the determination step is negative; and
   wherein separate blocks of telephone numbers associated with respective prescribed characteristics of numbers in the block are stored in the telephone number database local to the requesting machine and said determination step further comprises a step of determining to which block of telephone numbers in the telephone number database local to the requesting machine the destination telephone number of the request belongs, and if it is determined that the destination telephone number of the request belongs to a block of the numbering plan the characteristics associated with the block thus determined are read in the telephone number database local to the requesting machine, it is verified whether the destination telephone number of the request conforms to the characteristics thus read, and the request is forwarded from the requesting machine to the domain name server only if the verification result is a positive result.

2. The request-sending method according to claim 1, wherein at least one prescribed country code is stored in the local database, and said test includes verifying whether the country code of the destination telephone number of the request is stored in the local database.

3. The request-sending method according to claim 1, wherein the numbering plan is associated with a country code and the numbering plan corresponding to the country code of the destination telephone number of the request is that in relation to which said test is effected.

4. The request-sending method according to claim 1, wherein the characteristics of the block numbers are at least one of the following:
   a date of reservation of telephone numbers of the block;
   an end of a period of reservation of telephone numbers of the block;
   a date of assignment of telephone numbers of the block;
   an end of a period of assignment of telephone numbers of the block;
   a date of allocation of telephone numbers of the block;
   a date of ending allocation of telephone numbers of the block;
   a maximum length of the telephone numbers of the block;
   a minimum length of the telephone numbers of the block.

5. The request-sending method according to claim 1, wherein if the destination telephone number of the request fails said test, a signal is sent to the requesting machine to report an error in the destination telephone number of the request.

6. The request-sending method according to claim 1, wherein if the destination telephone number of the request fails said test, a signal is sent to the requesting machine to report an error in the destination telephone number of the request; and the signal reporting the error in the destination telephone number of the request contains information on the block number characteristics to which the destination telephone number of the request does not conform at the time of said verification.

7. The method of claim 1, wherein the prior test of the validity of the destination telephone number of the request is executed automatically and on the requesting machine.

8. The method of claim 1, wherein the telephone number database is in the requesting machine.

9. A device for sending at least one request to a domain name server from a requesting machine, said domain name server being an E.164.arpa telephone number domain name server and each name being determined from an E.164 format destination telephone number contained in said request, wherein the device is local to the requesting machine and includes means for receiving requests from the requesting machine, a telephone number database, means in the receiver means for automatically testing the validity of the destination telephone number of the request against data from the telephone number database, and means for forwarding the request from the requesting machine to the domain name server only if the control means determine that its destination telephone number has passed said validity test;

wherein at least one numbering plan is stored in the telephone number database, the numbering plan or each numbering plan comprising at least one block of telephone numbers, and said test includes determining whether the destination telephone number of the request belongs to a block of numbers of the numbering plan, the destination telephone number of the request failing said test if a result of the determination step is negative; and wherein separate blocks of telephone numbers associated with respective prescribed characteristics of numbers in the block are stored in the telephone number database and said determination further comprises determining to which block of telephone numbers in the telephone number database the destination telephone number of the request belongs, and if it is determined that the destination telephone number of the request belongs to a block of the numbering plan the characteristics associated with the block thus determined are read in the telephone number database, it is verified whether the destination telephone number of the request conforms to the characteristics thus read, and the request is forwarded from the requesting machine to the domain name server only if the verification result is a positive result.

10. The device according to claim 9, wherein the receiver means, the telephone number database, the automatic control means, and the sending means are in the requesting machine.

11. The device according to claim 10, wherein the receiver means, the automatic control means, and the sending means are in the requesting machine and the automatic control means can consult the telephone number database via a local area network.

12. A requesting machine including the device according to claim 9 for sending at least one request.

13. A system comprising at least one E.164.arp numbering domain name server and a plurality of requesting machines according to claim 12 configured to send at least one request to said at least one E.164.arp numbering domain name server.

14. The system of claim 9, wherein the device is in the requesting machine.

15. A computer program executing on a processor which, when used on a requesting machine, causes at least one request to be sent to a domain name server from the requesting machine, said domain name server being an E.164.arpa telephone number domain name server and each name being determined from an E.164 format destination telephone number contained in said request, the computer program comprising:

program code for executing a prior test of the validity of the destination telephone number of the request automatically and locally to the requesting machine relative to a telephone number database local to the requesting machine to forward the request from the requesting machine to the domain name server only if its destination telephone number passes said test;

program code for storing at least one numbering plan in the telephone number database local to the requesting machine, the numbering plan or each numbering plan comprising at least one block of telephone numbers, and said test includes a step of determining whether the destination telephone number of the request belongs to a block of numbers of the numbering plan, the destination telephone number of the request failing said test if a result of the determination step is negative; and program code for storing separate blocks of telephone numbers associated with respective prescribed characteristics of numbers in the block in the telephone number database local to the requesting machine and said determination step further comprises a step of determining to which block of telephone numbers in the telephone number database local to the requesting machine the destination telephone number of the request belongs, and if it is determined that the destination telephone number of the request belongs to a block of the numbering plan the characteristics associated with the block thus determined are read in the telephone number database local to the requesting machine, it is verified whether the destination telephone number of the request conforms to the characteristics thus read, and the request is forwarded from the requesting machine to the domain name server only if the verification result is a positive result.

* * * * *